United States Patent
Matsuishi et al.

(10) Patent No.: US 7,551,541 B2
(45) Date of Patent: Jun. 23, 2009

(54) OPTICAL INFORMATION RECORDING MEDIUM

(75) Inventors: Fujio Matsuishi, Tokyo (JP); Kanji Shimizu, Yokohama (JP)

(73) Assignee: Mitsubishi Kagaku Media Co., Ltd., tokyo (JP)

(*) Notice: Subject to any disclaimer, the term of this patent is extended or adjusted under 35 U.S.C. 154(b) by 787 days.

(21) Appl. No.: 11/176,342

(22) Filed: Jul. 8, 2005

(65) Prior Publication Data
US 2005/0265213 A1 Dec. 1, 2005

Related U.S. Application Data

(63) Continuation of application No. PCT/JP03/16975, filed on Dec. 26, 2003.

(30) Foreign Application Priority Data
Jan. 8, 2003 (JP) ............... 2003-002210

(51) Int. Cl.
*G11B 7/24* (2006.01)
(52) U.S. Cl. .............. 369/275.1; 369/288; 428/64.4
(58) Field of Classification Search ... 369/275.1–275.5, 369/288, 287, 283, 284, 277; 428/64.2, 64.4, 428/64.5, 64.8, 64.1; 430/270.16, 270.15
See application file for complete search history.

(56) References Cited

U.S. PATENT DOCUMENTS 7,336,293 B2 * 2/2008 Honda et al. .......... 347/224

2001/0026531 A1 10/2001 Onodera et al.

FOREIGN PATENT DOCUMENTS

| JP | 03-016028 | 1/1991 |
|---|---|---|
| JP | 5-325265 | 12/1993 |
| JP | 2000-173096 | 6/2000 |
| JP | 2000-235733 | 8/2000 |
| JP | 2001-273672 | 10/2001 |
| JP | 2002-74757 | 3/2002 |
| JP | 2002-203321 | 7/2002 |
| JP | 2003-242750 | 8/2003 |

OTHER PUBLICATIONS

U.S. Appl. No. 11/176,342, filed Jul. 8, 2005, Matsuishi et al.
U.S. Appl. No. 11/176,343, filed Jul. 8, 2005, Matsuishi et al.

* cited by examiner

*Primary Examiner*—Ali Neyzari
(74) *Attorney, Agent, or Firm*—Oblon, Spivak, McClelland, Maier & Neustadt, P.C.

(57) ABSTRACT

To provide an optical information recording medium on which visual information can be recorded on a label face side by using a laser apparatus for recording and reading electronic information by irradiation with a low output laser without exerting, e.g. thermal influence over electronic information recorded on the medium. The optical information recording medium of the present invention is an optical information recording medium 100 having such a structure that on a substrate 101, an electronic information recording layer 102, a reflective layer 103 formed in contact with the opposite side of the electronic information recording layer 102 from a side where a laser beam 107 enters, a protective layer 104, a visual information recording layer 105 and an overcoat layer 106 constituting an outermost layer are laminated in this order, and having a reflectivity against a beam applied from the label face side of at least 15 and at most 50%.

11 Claims, 3 Drawing Sheets

OPTICAL INFORMATION RECORDING MEDIUM

TECHNICAL FIELD

The present invention relates to an optical information recording medium capable of optically recording and reading information. More particularly, it relates to an optical information recording medium capable of optically recording and reading electronic information and further, capable of favorably recording visual information on a label face side by means of a laser beam.

BACKGROUND ART

Of an electronic information recording medium for recording, storing and rewriting a lot of information, importance as computer peripheral equipment is increasingly high in recent years. Particularly, an optical information recording medium on which recording and reading are carried out by means of a laser beam attracts attention as a mass storage recording medium since high density recording, storing and reading are possible. As examples of such an optical information recording medium, a phase-change type optical recording medium represented by CD-RW or DVD-RW and an organic dye type optical recording medium represented by CD-R or DVD-R may, for example, be mentioned.

The content of electronic information recorded in such an optical information recording medium can be confirmed by optical reading. On the other hand, it is important to display the content of electronic information as visual information on the surface of the medium in view of information management. Heretofore, as a display method therefor, a method of recording by printing the content of electronic information on a label face (the face opposite to the face on which electronic information is to be recorded) of a medium by means of an ink jet printer or a thermal transfer printer, or a method of bonding, e.g. a label on which the content of electronic information is recorded to a label face of a medium, may, for example, be employed. Further, in recent years, a method of recording visual information on a label face side of a medium by means of a laser beam has been reported (e.g. JP-A-2000-173096, JP-A-2001-283464), which is expected as a method of recording visual information without exerting mechanical influences over a medium.

DISCLOSURE OF THE INVENTION

The above method of recording visual information on a label face side of a medium by means of a laser beam, as reported in JP-A-2000-173096 and JP-A-2001-283464, has the following drawbacks. Namely, the method of recording visual information on a label face side of a medium by means of a laser beam utilizes a change such as a reaction, melting or precipitation due to heat, and thus excessive irradiation with a laser beam will have a thermal influence or the like over the electronic information recorded on a medium, and accordingly careful attention has to be paid to an irradiation method. Accordingly, in order to reduce a thermal influence over a medium, it is necessary to use a laser beam with a low output at a level of from 10 to 200 mW. When such a low output laser beam is used, it is effective to efficiently concentrate the energy of the laser beam by condensing the low output laser beam on a layer (visual information recording layer) on which visual information is to be recorded, and for that purpose, it is considered necessary to apply a focus servo.

In such a case, in order to stably focus the laser beam, it is required to sufficiently secure the amount of a reflected light which is a reflected laser beam applied from a label face side. Usually, when the laser beam absorptivity of a visual information recording layer is increased, favorable recording becomes possible on the visual information recording layer even by irradiation with a low power laser beam, but the reflectivity against the laser beam applied from the label face side decreases, whereby stable focusing becomes difficult. On the other hand, when the laser beam absorptivity of a visual information recording layer is lowered, although it is possible to increase the reflectivity against a laser beam applied from the label face side, favorable recording on the visual information recording layer by irradiation with a low power laser beam becomes difficult.

The present invention has been made to solve technical problems which showed up when visual information is recorded on a visual information recording layer formed on a label face side of an optical information recording medium by means of a low output laser beam. Accordingly, the object of the present invention is to provide an optical information recording medium on which visual information can be recorded on a label face side by means of a low output laser beam without exerting bad influences over electronic information recorded on the medium.

In order to achieve such an object, the optical information recording medium of the present invention is formed so that the reflectivity against a laser beam applied from a label face side is within a certain range. Namely, the optical information recording medium of the present invention comprises a substrate, and a visual information recording layer which is formed directly or via another layer on the substrate and on which visual information is to be recorded by means of a laser beam to be applied from a label face side on the opposite side from the substrate side, and is characterized by having a reflectivity against a laser beam applied from the label face side of at least 15% and at most 50%.

Further, the optical information recording medium of the present invention comprises a substrate having guide grooves and/or pits for recording and reading, and at least an electronic information recording layer on which digital information is to be recorded by means of a laser beam to be applied from the substrate side, a reflective layer and a visual information recording layer on which visual information is to be recorded by means of a laser beam to be applied from a label face side on the opposite side from the substrate side, laminated in this order on the substrate, and is characterized by having a reflectivity against a laser beam applied from the label face side on the opposite side from the substrate side of at least 15% and at most 50%.

Further, the visual information recording layer of the optical information recording medium of the present invention is characterized in that an overcoat layer is formed on the label face side of the visual information recording layer. In such a case, the overcoat layer is formed preferably in such a manner that the lower limit of the thickness of the overcoat layer is 10 μm, and the upper limit is 100 μm. Further, the visual information recording layer is characterized by being formed by such a material that its color developing properties or its transparency changes by a laser beam applied to the visual information recording layer. Further, the visual information recording layer is preferably such that a reflective layer is formed on at least one side of the visual information recording layer. In such a case, the visual information recording layer and the reflective layer may be in contact with each other, or an optional layer which is transparent to a laser beam may be formed between the visual information recording layer and the reflective layer.

Further, the optical information recording medium of the present invention comprises a substrate, and an electronic information recording layer on which digital information is to be recorded by means of a beam to be applied from the substrate side, a reflective layer formed on the opposite side of the electronic information recording layer from the substrate side, and a protective layer formed on the opposite side of the reflective layer from the substrate side, formed directly or via another layer on the substrate, and is characterized by having a visual information recording layer which is formed on the opposite side of the protective layer from the substrate side and on which visual information is to be recorded by means of a laser beam to be applied from a label face side on the opposite side from the substrate side, and an overcoat layer formed by a material transparent to a laser beam on the label face side of the visual information recording layer, and by having a reflectivity against a laser beam applied from the label face side on the opposite side from the substrate side, of at least 15% and at most 50%.

In the present invention, "visual information" represents information which is visually read, such as characters, symbols, images such as illustrations and photographs, and geometric patterns, and "electronic information" represents information, the content of which is read by some reading device, such as information recorded by digital signals.

EFFECTS OF THE INVENTION

According to the present invention, an optical information recording medium on which visual information can be recorded on a label face by means of irradiation with a low output laser beam at a level of from 10 to 200 mW can be provided.

EXPLANATION OF NUMERICAL REFERENCES 11, 100, 200: optical information recording medium, 12: spindle, 13: spindle motor, 14: stepping motor, 15: screw axis, 16: pickup, 17: laser beam, 101, 201: substrate, 102, 202: electronic information recording layer, 103: reflective layer, 203: first reflective layer, 104, 204: protective layer, 105, 205: visual information recording layer, 106, 206: overcoat layer, 107, 207: laser beam, 108, 208: laser beam, 109, 209: reflected light, 213: translucent second reflective layer, 300: recording apparatus

BEST MODE FOR CARRYING OUT THE INVENTION

Now, the optical information recording medium as the embodiment of the present invention will be described in detail below with reference to figures.

FIRST EMBODIMENT

Figure 1:
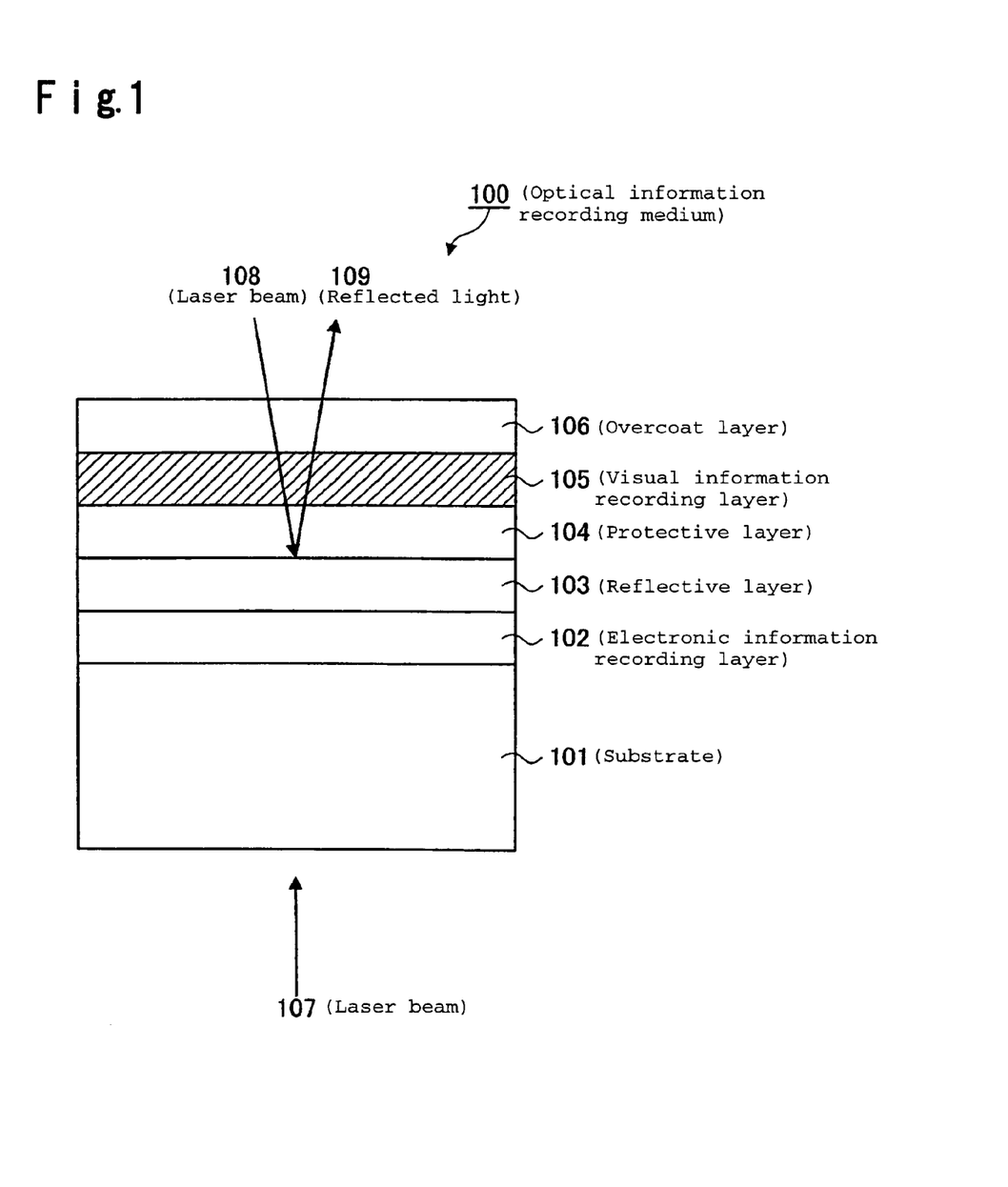
FIG. 1 is a diagram illustrating the structure of the first embodiment of an optical information recording medium as the embodiment of the present invention.

FIG. 1 is a diagram illustrating the structure of the first embodiment of an optical information recording medium as the embodiment of the present invention. An optical information recording medium 100 shown in this FIG. has such a structure that on a substrate 101, an electronic information recording layer 102, a reflective layer 103 formed in contact with the opposite side of the electronic information recording layer 102 from the side where a laser beam 107 enters, a protective layer 104, a visual information recording layer 105 and an overcoat layer 106 constituting an outermost layer are laminated in this order.

As shown in FIG. 1, on the electronic information recording layer 102 formed in the optical information recording medium 100, recording and reading of electronic information are carried out by means of the laser beam 107 applied via the substrate 101 from an objective lens (not shown) of a laser apparatus for recording and reading electronic information. On the other hand, on the visual information recording layer 105, visual information is recorded by means of a laser beam 108 applied via the overcoat layer 106 from a label face side, for example, when the optical information recording medium 100 is reversed and set to the laser apparatus for recording and reading electronic information. Further, a part of the laser beam 108 is reflected on the reflective layer 103 formed on a lower side (the substrate 101 side) of the visual information recording layer 105, and the resulting reflected light 109 is utilized for focusing to focus the laser beam 108.

The substrate 101 is basically formed by a material which is transparent to wavelengths of a recording light and a reading light for the electronic information recording layer 102. As a material to form the substrate 101, a polymeric material such as a polycarbonate resin, an acrylic resin, a methacrylic resin, a polystyrene resin, a vinyl chloride resin, an epoxy resin, a polyester resin or an amorphous polyolefin resin, or an inorganic substance such as glass may, for example, be used. Particularly, a polycarbonate resin is excellent in view of high light transparency, a small optical anisotropy and a high mechanical strength, and is preferred. In view of chemical resistance, moisture absorption resistance, optical characteristics, etc., an amorphous polyolefin is preferred.

On the substrate 101, for example, on the side which is in contact with the electronic information recording layer 102, guide grooves and/or pits for recording and reading are provided, which are formed by a molding method such as injection molding. Such guide grooves and/or pits are preferably formed at the time of formation of the substrate 101, but they may be formed by using an ultraviolet (UV)-curing resin on the substrate 101. Further, the lower limit of the thickness of the substrate 101 is usually 1.1 mm, preferably 1.15 mm, and the upper limit of the thickness is usually 1.3 mm, preferably 1.25 mm.

The electronic information recording layer 102 is formed by a material capable of recording electronic information (information, the content of which is read by some reading device, such as information recorded by digital signals) thereon by irradiation with a laser beam 107, and it is usually formed as a recording layer comprising an organic substance or a recording layer comprising an inorganic substance. The electronic information recording layer 102 may be directly formed on the substrate 101, or an optional layer may be formed between the substrate 101 and the electronic information recording layer 102 as the case requires.

When the electronic information recording layer 102 is a recording layer comprising an organic substance, an organic dye is mainly used. As such an organic dye, a macrocyclic azaannulene dye (such as phthalocyanine dye, naphthalocyanine dye or porphyrin dye), a polymethine dye (such as cyanine dye, merocyanine dye or squarylium dye), an anthraquinone dye, an azulenium dye, an azo dye, a metal complex of azo dyes or a metal complex of indoaniline dyes may, for example, be mentioned. Among them, a metal complex of azo dyes, a cyanine dye and a phthalocyanine dye are preferred. Particularly, a metal complex of azo dyes is preferred since it is excellent in durability and light resistance.

As the method for forming the electronic information recording layer 102 comprising an organic substance, a dry film formation method such as a vacuum deposition method or a sputtering method, or a wet film formation method which is generally carried out, such as a casting method, a spin coating method or a dipping method may be mentioned. Among them, a wet film formation method is preferred in view of mass productivity and cost, and a spin coating method is particularly preferred.

When the electronic information recording layer 102 is formed as a recording layer comprising an inorganic substance, a rare earth transition metal alloy such as Tb.Te.Co. or Dy.Fe.Co. for recording by photomagnetic effect may, for example, be used. Further, a chalcogenide alloy such as Ge.Te. or Ge.Sb.Te which undergoes phase change may also be used. Such a layer may be a single layer or may consist of two or more layers.

As the method for forming the electronic information recording layer 102 comprising an inorganic substance, a deposition method, an ion plating method or a sputtering method may, for example, be mentioned. Among them, a sputtering method is particularly preferred in view of mass productivity and cost. Further, the thickness of the electronic information recording layer 102 varies depending upon the type of the recording layer, and the lower limit is usually 5 nm, preferably 10 nm, and the upper limit is usually 500 nm, preferably 300 nm. Further, the electronic information recording layer 102 of the optical information recording medium 100 of the present invention may be a phase-change type recording layer on which recording and erasing are possible.

The reflective layer 103 is formed on the opposite side of the electronic information recording layer 102 from the substrate 101, and usually has a function to reflect the laser beam 107 to be applied form the substrate 101 side to the substrate 101 side. When guide grooves and/or pits for recording and reading are formed on the substrate 101, the reflective layer 103 has recessions and protrusions corresponding thereto. As a material to form the reflective layer 103, one having an adequately high reflectivity at the wavelength of the reading light may be mentioned. For example, a metal such as Au, Al, Ag, Cu, Ti, Cr, Ni, Pt, Ta or Pd may be used alone or as an alloy. Among them, Au, Al and Ag have a high reflectivity and are suitable as the material for reflective layer. Further, one containing Ag as the main component is particularly preferred in view of a low cost, a high reflectivity, etc.

As the method for forming the reflective layer 103, a deposition method, an ion plating method or a sputtering method may, for example, be mentioned. Among them, a sputtering method is particularly preferred in view of mass productivity and cost. Further, the lower limit of the thickness of the reflective layer 103 is usually 30 nm, preferably 50 nm, and the upper limit is usually 150 nm, preferably 120 nm.

The protective layer 104 is usually formed from a material which is transparent to a laser beam, and an ultraviolet (UV)-curing resin may, for example, be mentioned. As specific examples of an ultraviolet (UV)-curing resin, acrylate resins such as urethane acrylate, epoxy acrylate and polyester acrylate may, for example, be used. Most of such materials are substances which are transparent to a laser beam and therefore preferably used. Such ultraviolet (UV)-curing resins may be used alone or as a mixture of two or more of them. Further, the protective layer 104 may be a single layer film consisting of one layer or a multilayer film consisting of two or more layers.

As the method for forming the protective layer 104 from an ultraviolet (UV)-curing resin, it can be formed by coating the ultraviolet (UV)-curing resin as it is or a coating liquid prepared by dissolving the resin in a proper solvent, on the reflective layer 103, followed by irradiation with ultraviolet (UV) rays for curing. In such a case, as the coating method, a spin coating method or a casting method may, for example, be employed. The protective layer 104 may be formed also by the above-described coating method, a wet film formation method such as a screen printing method, or a dry film formation method such as a vacuum deposition method, a sputtering method or an ion plating method, and it is formed by a method optionally selected in accordance with the material to be used. Among them, a wet film formation method, particularly a spin coating method is preferred, and a spin coating method is commonly employed. The lower limit of the thickness of the protective layer 104 is usually 1 μm, preferably 3 μm, and the upper limit is usually 15 μm, preferably 10 μm.

The visual information recording layer 105 is usually such a layer that the color of a recording material constituting the layer changes by irradiation with a laser beam and as a result, visual information (information which is visually read, such as characters, symbols, images such as illustrations and photographs, and geometric patterns) is recorded. The recording material constituting the visual information recording layer 105 is not particularly limited, but a substance by which the absorption of a visible light is changed is roughly classified into the following type (a) the color developing properties of which change and type (b) the transparency of which changes.

A recording material of the type (a) the color developing properties of which change may, for example, be a color developing organic dye which is commonly used for optical recording of electronic information. As such an organic dye, a macrocyclic azaannulene dye (such as phthalocyanine dye, naphthalocyanine dye or porphyrin dye), a polymethine dye (such as cyanine dye, merocyanine dye or squarylium dye), an anthraquinone dye, an azulenium dye, an azo dye, a metal complex of azo dyes or a metal complex of indoaniline dyes may, for example, be mentioned.

Further, a leuco dye having a lactone ring moiety in its molecular structure may be mentioned. When a leuco dye is used, the contrast at the time of color development can be made high, and the amount of heat required for the color development can be suppressed low, such being preferred.

Specifically, the leuco dye may, for example, be a fluorane compound such as 3-diethylamino-7-chloroanilinofluorane, 3-diethylamino-6-methyl-7-anilinofluorane, 3-dibutylamino-6-methyl-7-anilinofluorane, 3-diethylamino-6-methyl-7-2,4-xylidinofluorane, 3-diethylamino-6-methyl-7-(m-toluidino)-fluorane, 3-diethylamino-7,8-benzofluorane or 3-diethylamino-6-methyl-7-xylidinofluorane; or a phthalide compound such as crystal violet lactone, 3-(4-diethylamino-2-ethoxyphenyl)-3-(1-ethyl-2-methylindole-3-yl)-4-azaphthalide, 3-(4-diethylaminophenyl)-3-(1-ethyl-2-methylindole-3-yl) phthalide or 3,3-bis(l-n-butyl-2-methylindole-3-yl) phtalide. Among them, a phthalide compound is preferred.

With such a leuco dye, as the case requires, an electron-accepting compound, a dye which absorbs a recoding laser beam and generates heat, etc. may be used in combination. In such a case, the electron-accepting compound may, for example, be an organic phosphoric acid compound having an aliphatic group having at most 6 carbon atoms, an aliphatic carboxylic acid compound or a phenolic compound. Preferred is a phenolic compound.

As specific examples of the electron-accepting compound, the organic phosphoric acid compound may, for example, be dodecylphosphonic acid, tetradecylphosphonic acid, hexadecylphosphonic acid, octadecylphosphonic acid or eucocylphosphonic acid.

The aliphatic carboxylic acid compound may, for example, be α-hydroxydecanoic acid, α-hydroxytetradecanoic acid, α-hydroxyhexadecanoic acid, α-hydroxyoctadecanoic acid, α-hydroxypentadecanoic acid, α-hydroxyeicosanoic acid, α-hydroxydocosanoic acid, α-hydroxytetracosanoic acid, α-hydroxyhexacosanoic acid or α-hydroxyoctacosanoic acid.

Further, the phenolic compound may, for example, be a gallic acid compound, a benzoic acid compound or a bisphenol compound.

As specific examples of such a compound, the gallic acid compound may, for example, be methyl gallate, propyl gallate, butyl gallate or lauryl gallate. The benzoic acid compound may, for example, be methyl p-hydroxybenzoate, ethyl p-hydroxybenzoate or 2,4-dihydroxybenzoic acid. The bisphenol compound may, for example, be bisphenol S or bisphenol A. Further, 4'-hydroxy-4-octadecylbenzanilide, N-octadecyl-4-hydroxybenzamide, N-(4-hydroxyphenyl)-N'-cotadecylurea or 4-hydroxyphenylpropiono-behenyl hydrazide may, for example, be mentioned.

Such an electron-accepting compound may be used alone or in combination as a mixture of plural types thereof.

The laser beam absorbing dye may, for example, be various dyes as described as the organic dyes to be used for optical recording of electronic information, or an infrared ray absorbing dye such as a bisanthrone type or an indoaniline type.

Further, a recording material of the type (b) the transparency of which changes may, for example, be an organic low molecular weight compound which is dispersed in a resin host material in a size at a level of from 0.1 to 2 μm and which will be melted or crystallized by a heat treatment. As such a compound, a known organic low molecular weight compound such as a higher fatty acid having at least 12 carbon atoms may, for example, be used. Such an organic low molecular weight compound may be a compound consisting of a fatty acid, an aliphatic dibasic acid, a ketone, an ether, an alcohol, a fatty acid ester or a derivative thereof, and such compounds may be used alone or as a mixture of two or more types thereof.

Among the organic low molecular weight compounds which will be melted or crystallized by a heat treatment, a fatty acid alkyl ester having at least 12 carbon atoms has a low melting point (mp) and is melted or crystallized by a heat treatment at a relatively low temperature, and is thereby preferred. When a high melting point (mp) aliphatic dibasic acid having at least 10 carbon atoms is used together with the fatty acid alkyl ester having at least 12 carbon atoms, and the blend ratio of the fatty acid alkyl ester and the aliphatic dibasic acid is adjusted, the temperature range within which the fatty acid alkyl ester is clarified can be adjusted, and the transparency and the degree of white turbidity at a predetermined temperature can be changed.

The fatty acid alkyl ester having at least 12 carbon atoms may, for example, be methyl stearate, ethyl stearate, butyl stearate, octyl stearate, stearyl stearate, behenyl stearate, methyl behenate, ethyl behenate, buthyl behenate, octyl behenate, stearyl behenate, behenyl behenate, methyl lignocerate or ethyl lignocerate.

Further, the aliphatic dibasic acid having at least 10 carbon atoms may, for example, be sebacic acid, dodecanoic diacid, tetradecanoic diacid or eicosanoic diacid. When the fatty acid alkyl ester having at least 12 carbon atoms and the aliphatic dibasic acid having at least 10 carbon atoms are used in combination, the blend ratio of the former: the latter is preferably at a level of from 1:1 to 10:1, more preferably from 2:1 to 6:1. The high melting point aliphatic dibasic acid is considered to have a role to control the crystallization behavior as seed crystals of the low melting point fatty acid alkyl ester, and accordingly its blending amount is too small, there may be no effect, and if it is too large, there is possibility that the contrast decreases.

Among these recording materials constituting the visual information recording layer 105, the type (a) the color developing properties of which change, which contains a leuco dye, and the type (b) the transparency of which changes, are preferred since no gas will be generated at the time of color development, whereby there is no fear that another layer such as an overcoat layer 106 formed on the visual information recording layer 105 floats or is peeled.

As the method for forming the visual information recording layer 105, a known wet film formation method as mentioned for the method for forming the electronic information recording layer 102 may be mentioned. Among them, preferred is a spin coating method or a screen printing method, more preferred is a spin coating method. Further, the lower limit of the thickness of the visual information recording layer 105 is usually 0.1 μm, preferably 0.5 μm and the upper limit of the thickness is usually 5 μm, preferably 3 μm.

The overcoat layer 106 is formed on the label face side of the visual information recording layer 105 and constitutes an outermost layer to prevent the visual information recording layer 105 from physical scratching and to efficiently focus the laser beam 108 on the visual information recording layer 105. By forming the overcoat layer 106, the laser beam 108 can be efficiently focused, whereby visual information can be recorded on the visual information recording layer 105 even when the power of the laser beam 108 is lowered. Accordingly, thermal influences over electronic information can be further reduced.

The material constituting the overcoat layer 106 is not particularly limited so long as it is a material which protects the visual information recording layer 105 from, e.g. external force and which is transparent to a laser beam.

As the material constituting the overcoat layer 106, as an organic substance, a thermoplastic resin, a thermosetting resin, an electronic ray-curing resin or an ultraviolet (UV)-curing resin may, for example, be mentioned. The thermoplastic resin, the thermosetting resin or the like is dissolved in a proper solvent to prepare a coating liquid, which is coated and dried to form the overcoat layer 106. The ultraviolet (UV)-curing resin as it is or a coating liquid prepared by dissolving the resin in a proper solvent is coated, followed by irradiation with ultraviolet (UV) rays for curing to form the overcoat layer 106. The ultraviolet (UV)-curing resin may, for example, be an acrylate resin such as urethane acrylate, epoxy acrylate or polyester acrylate. Further, as an inorganic substance, $SiO_2$, $SiN_4$, $MgF_2$ or $SnO_2$ may, for example, be mentioned. Such materials may be used alone or as a mixture of two or more of them. Further, the overcoat layer 106 may be a single layer film or a multilayer film consisting of two or more layers.

The overcoat layer 106 is formed preferably by a wet film formation method using the above-described various organic substances. As the wet film formation method, a spin coating method, a casting method, a screen printing method or the like may be employed in the same manner as in the case of the above-described protective layer 104. Among them, a spin coating method is particularly preferred in view of high smoothness on the surface. Particularly when a transparent substrate prepared by a material transparent to a laser beam is to be bonded to form the overcoat layer 106, accurate positioning of the substrate is required, and various devices in production process will be required such that the bonding step is carried out under reduced pressure so that no bubbles will be contained in an adhesive layer. Accordingly, it is advantageous that the overcoat layer 106 is formed by a wet film formation method such as spin coating or screen printing in view of productivity.

The lower limit of the thickness of the overcoat layer 106 is 10 μm, preferably 20 μm, and the upper limit of the thickness is 100 μm, preferably 80 μm.

If the overcoat layer 106 is excessively thin, its function to protect the visual information recording layer 105 may not sufficiently be maintained. Further, focusing of the recording laser beam tends to be unstable, whereby recording may not stably be carried out. For example, in a case where the thickness of the overcoat layer 106 is less than 10 μm, if the change in thickness in the circumferential direction of the overcoat layer 106 is more than the wavelength (at most 900 nm) of the laser beam, interference of laser beams occurs, and the change in the amount of reflected light for focusing tends to be significant, whereby there is fear that no stable focusing can be carried out. When the thickness is at least 10 μm, the interference hardly occurs even when there is a change in thickness, whereby stable focusing becomes possible.

If the overcoat layer 106 is excessively thick, when it is formed by coating, double coating or the like will be required, thus making the formation process complicated. Further, such a problem may arise that the warpage of the disk is significant due to shrinkage on curing of the coating material. The refractive index of the overcoat layer 106 is preferably at least 0.4, more preferably at least 0.5. Further, it is preferably at most 2.6, more preferably at most 1.9. If the refractive index of the overcoat layer 106 is excessively high, the amount of reflection of the laser beam 108 on the surface of the overcoat layer 106 tends to increase, whereby efficient recording of visual information on the visual information recording layer 105 becomes difficult.

In general, when a layer is formed by a spin coating method, the thickness of the layer to be formed is controlled by controlling three elements, i.e. the viscosity of the coating liquid, the speed of rotation and the rotation period.

In general, the upper limit of the thickness of a layer such as a protective layer to be formed on an optical disk is at a level of from 3 to 7 μm. Accordingly, when a layer is formed by a spin coating method, the viscosity of the coating liquid to form the layer is controlled to at most 100 CPS, the speed of rotation from 7,000 to 1,000 rpm and the rotation period from 1 to 3 seconds to form the layer.

However, in the present invention, an overcoat layer having a thickness of at least 10 μm, which is a layer thicker than, e.g. a protective layer which is generally formed on an optical disk, is formed. Accordingly, when the overcoat layer is formed by a spin coating method, the overcoat layer is formed by increasing the viscosity of the coating liquid as high as possible, reducing the speed of rotation as low as possible, and increasing the rotation period as long as possible. Specifically, the viscosity is usually at least 200 CPS, preferably at least 300 CPS, and usually at most 10,000 CPS, preferably at most 6,000 CPS, the speed of rotation is usually at least 1,000 rpm, preferably at least 2,000 rpm, and usually at most 6,000 rpm, preferably at most 5,000 rpm, and the rotation speed is usually at least 4 seconds and at most 10 seconds.

The optical information recording medium 100 of the present invention is formed so that the reflectivity against a beam applied from the label face side is within a range of at least 15%, preferably at least 20%, and at most 50%, preferably at most 40%.

The reflectivity is a numerical value obtained in such a manner that the label face side of the optical information recording medium 100 before visual information is recorded is irradiated with a beam having a wavelength corresponding to the wavelength ($\lambda$) of a laser beam to be applied to the visual information recording layer 105, and the spectral reflectivity on the label face side is measured by using an integrating sphere (a spacer with an angle of 10°) for reflectivity measurement of a spectrophotometer. The laser beam commonly used in the present invention is a semiconductor laser beam, and a semiconductor laser beam has a wavelength ($\lambda$) at a level of from 300 to 800 nm.

The optical information recording medium 100 of the present invention is formed so that the reflectivity against a laser beam to be applied from the label face side is within a range of at least 15%, preferably at least 20%, and at most 50%, preferably at most 40%, whereby the balance between the proportion of the laser beam 108 applied from the label face side absorbed in the visual information recording layer 105 and the proportion of the reflected light 109 reflected on the label face side will be maintained. As a result, the amount of light which enters the visual information recording layer 105 will be secured, and further, the reflected light 109 which is reflected laser beam 108 applied from the label face side will be stabilized, and focusing is carried out by this stabilized reflected light 109. Accordingly, recording of clear visual information on the visual information recording layer 105 becomes possible by using a low output laser beam.

The method of forming the optical information recording medium 100 of the present invention so that the reflectivity against a laser beam to be applied from the label face side is within a range of at least 15% and at most 50% is not particularly limited. For example, when the visual information recording layer 105 comprises a color developing organic dye, the absorptivity of the visual information recording layer 105 against the laser beam 108 is controlled by the blend ratio of the color developing organic dye and the laser beam absorbing dye to be used in combination, to make the reflectivity at least 15% and at most 50%. Here, the absorptivity is measured as the absorbance. In such a case, the laser beam absorbing dye is incorporated at a solid content concentration of at least 1 wt %, preferably at least 3 wt % and at most 15 wt %, preferably at most 7 wt %, in the composition (coating liquid) of the recording materials used for forming the visual information recording layer 105. In general, considering the heat absorption efficiency of the visual information recording layer, the laser beam absorbing dye is to be incorporated in an amount of about 20%. However, in the present invention, the amount of the laser beam absorbing dye is within the above range to adjust the reflectivity so that the reflectivity will be at least 15% and at most 50%.

Further, it is also possible to control the reflectivity by changing the thickness of the visual information recording layer 105 to be formed by a wet film formation method. The reflectivity can be decreased by increasing the thickness of the visual information recording layer 105, and the reflectivity can be increased by reducing the thickness of the visual information recording layer 105. In general, the lower limit of the thickness of the visual information recording layer 105 to achieve a reflectivity of at least 15% and at most 50% is usually at least 0.1 µm, preferably at least 0.5 µm, and the upper limit of the thickness is usually at most 5 µm, preferably at most 3 µm. In general, in order that a portion on which recording is to be carried out of the visual information recording layer is sufficiently changed to clearly record visual information, the thickness of the visual information recording layer is to be at a level of 10 µm. However, in the present invention, the thickness of the visual information recording layer 105 is within the above range to adjust the reflectivity so that the reflectivity will be at least 15% and at most 50%.

In the present invention, in order that the reflectivity is stably at least 15% and at most 50%, it is very effective that the content of the laser beam absorbing dye in the visual information recording layer 105 is at least 1 wt % and at most 15 wt % as a solid content concentration and that the thickness of the visual information recording layer 105 is at least 0.1 µm and at most 5 µm.

In the optical information recording medium 100 of the present invention, the reflective layer 103 plays a role as a reflective layer against the laser beam 107 applied from the substrate 101 side for recording electronic information and a role as a reflective layer against the laser beam 108 applied from the label face side for recording visual information, whereby the structure of layers is simplified, and the production cost is reduced. Further, a second reflective layer is preferably formed on the lower side (the side opposite to the plane of incidence of the recording laser beam) of the visual information recording layer 105 so as to obtain the reflected light 109 for stable focusing when visual information is recorded on the visual information recording layer 105. Further, an overcoat layer formed from a material transparent to a laser beam may be formed between the second reflective layer and the visual information recording layer 105.

SECOND EMBODIMENT

Figure 2:
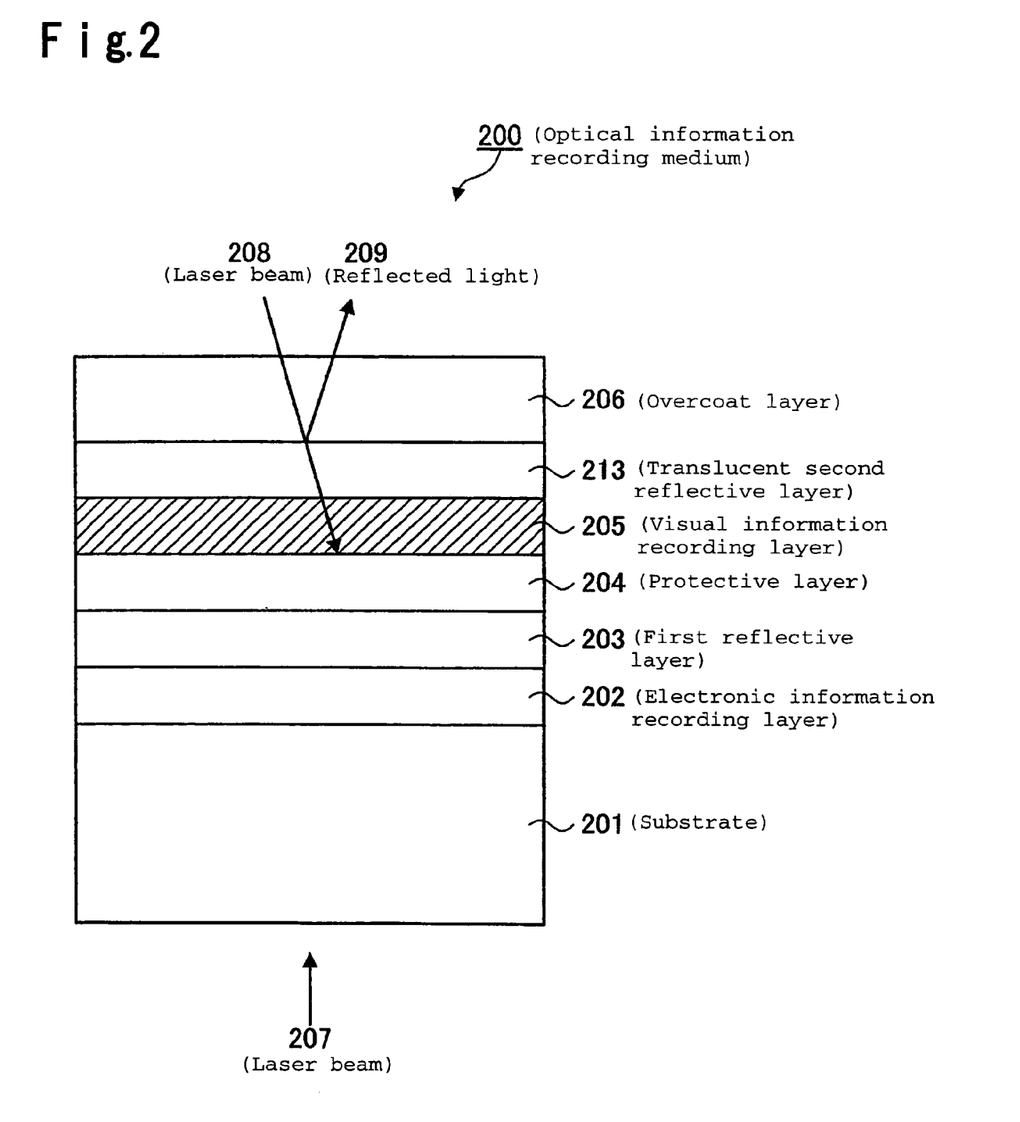
FIG. 2 is a diagram illustrating the structure of the second embodiment of an optical information recording medium as the embodiment of the present invention.

FIG. 2 is a diagram illustrating the structure of the second embodiment of the information recording medium of the present invention. An optical information recording medium 200 shown in this FIG. has such a structure that on a substrate 201, an electronic information recording layer 202, a first reflective layer 203 formed in contact with the opposite side of the electronic information recording layer 202 from the side where a laser beam 207 enters, a protective layer 204, a visual information recording layer 205, a translucent second reflective layer 213 and an overcoat layer 206 constituting an outermost layer are laminated in this order.

As shown in FIG. 2, on the electronic information recording layer 202 formed in the optical information recording medium 200, recording and reading of electronic information are carried out by means of the laser beam 207 applied via the substrate 201 from an objective lens (not shown) of a laser apparatus for recording and reading electronic information. On the other hand, on the visual information recording layer 205, visual information is recorded by means of a laser beam 208 applied via the overcoat layer 206 from a label face side, for example, when the optical information recording medium 200 is reversed and set to the laser apparatus for recording and reading electronic information. Further, a part of the laser beam 208 is reflected on the translucent second reflective layer 213 formed in contact with the upper side of the visual information recording layer 205, and the resulting reflected light 209 is utilized for focusing to focus the laser beam 208.

Explanation of matters overlapping with those of the optical information recording medium 100 in the above-described first embodiment, such as the shapes and materials of the respective layers constituting the optical information recording medium 200 of the present invention, are omitted, and different matters alone will be described in detail below.

In the optical information recording medium 200 of the present invention, a translucent second reflective layer 213 is formed on the upper side (label face side) of the visual information recording layer 205. The translucent second reflective layer 213 is formed by using a material similar to that for the first reflective layer 203 so that the reflectivity will be at a level of at least 10% and at most 50%. Further, the translucent second reflective layer 213 has a function to reflect a part of the laser beam 208 applied from the label face side and transmit a part of the laser beam to make it reach the visual information recording layer 205. The method of controlling the reflectivity of the translucent second reflective layer 213 is not particularly limited, but a method of controlling it by changing the thickness of the layer may be mentioned. As a material to form the translucent second reflective layer 213, a metal such as Au, Al, Ag, Cu, Ti, Cr, Ni, Pt, Ta or Pd may be used alone or as an alloy. Among them, Au, Al and Ag are preferred since it is easy to control the reflectivity by changing the thickness of the layer with them.

As the method for forming the translucent second reflective layer 213, a deposition method, an ion plating method or a sputtering method may, for example, be mentioned. Among them, a sputtering method is particularly preferred in view of mass productivity and cost. Further, the lower limit of the thickness of the translucent second reflective layer 213 is usually 3 nm, preferably 5 nm, and the upper limit is usually 70 nm, preferably 50 nm.

In the optical information recording medium 200 of the present invention, the translucent second reflective layer 213 is formed on the upper side (the label face side) of the visual information recording layer 205, whereby the laser beam 208 applied from the label face side is reflected on the translucent second reflective layer 213, and the reflected light 209 is utilized to carry out focusing, and accordingly recording of clear visual information on the visual information recording layer 205 becomes possible by using a low output laser beam.

In each of the optical information recording mediums 100 and 200 of the present invention, an optional layer other than the above-described layers may be formed. Further, an optional layer may be formed between the respective layers or in contact with the outermost layer of each of the optical information recording mediums 100 and 200. For example, when a recording layer comprising an inorganic substance is used as the electronic information recording layer 102 in the first embodiment, a dielectric layer which supports the electronic information recording layer 102 is formed.

Two embodiments of the optical recording medium of the present invention have been explained above, but the embodiment of the present invention is not limited to the above embodiments, and various modifications may be made. For example, the optical information recording medium may have a plurality of electronic recording layers. Further, in a case of an optical recording medium comprising a substrate (first substrate) having a thickness of about 0.6 mm and having guide grooves and/or pits and a so-called dummy substrate (second substrate) not having guide grooves and/or pits, the present invention may be applied by employing a laminate structure comprising first substrate/electronic information recording layer/reflective layer/adhesive layer/second substrate/visual information recording layer/overcoat layer or a laminate structure comprising first substrate/electronic information recording layer/reflective layer/adhesive layer/visual information recording layer/second substrate. In such a case, the overcoat layer side and the second substrate side are on the label face side, respectively, and as the case requires, another layer may be formed between the layers or as an outermost layer.

Further, the present invention is not limited to a so-called substrate face incident type optical disk, and in a case of a so-called film face incident type optical recording medium on which a laser beam is applied from the protective layer side (i.e. film face side) for recording and reading information, the present invention may be applied by employing a laminate structure comprising overcoat layer/visual information recording layer/substrate/reflective layer/electronic information recording layer/protective layer. In such a case, the overcoat layer side is on the label face side, and the substrate has guide grooves and/or pits on the side on which the information recording layer is formed. Further, another layer may be formed between the layers or as an outermost layer as the case requires.

EXAMPLES

Now, the optical information recording medium of the present invention will be explained in further detail with reference to Examples. However, the present invention is by no means restricted to such specific Examples.

(1) Recording of Visual Information on Optical Information Recording Medium

Figure 3:
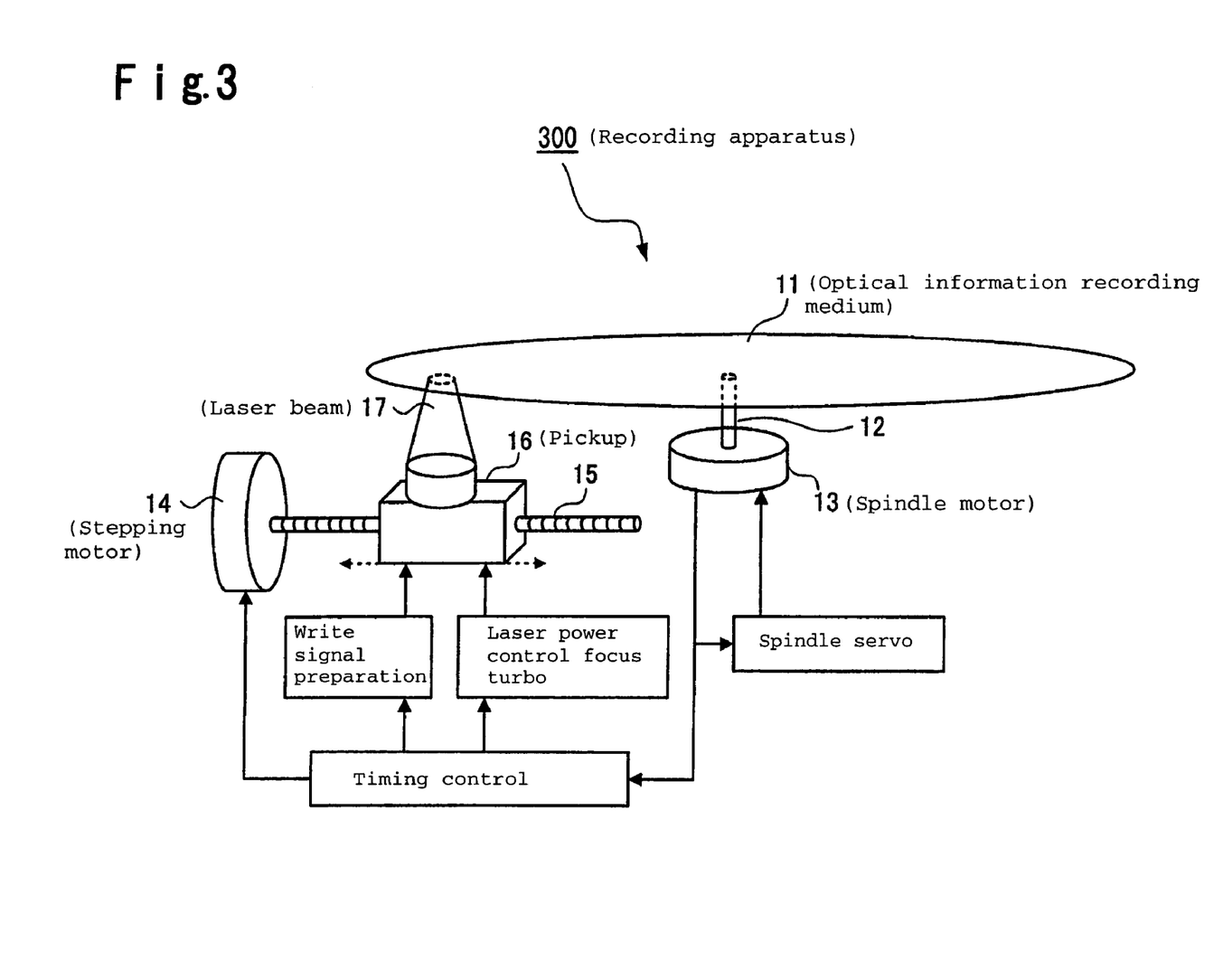
FIG. 3 is a diagram illustrating a recording apparatus for recording visual information on an optical information recording medium having a visual information recording layer.

FIG. 3 is a diagram illustrating a recording apparatus for recording visual information on an optical information recording medium having a visual information recording layer. A recording apparatus 300 as shown in FIG. 3 is to carry out recording of visual information on an optical information recording medium 11 having a visual information recording layer by a conventional optical disk drive, and comprises a spindle 12 to which the optical information recording medium 11 is mounted, a spindle motor 13 which rotates the spindle 12, a stepping motor 14 for feed, a screw axis 15 which is rotated by the stepping motor 14 and a pickup 16 which moves to an optional position.

As shown in FIG. 3, in the recording apparatus 300, the optical information recording medium 11 is mounted on the spindle 12 and rotated by the spindle motor 13, and at the same time, the screw axis 15 is rotated by the stepping motor 14 for feed to move the pickup 16 to an optional position. The spindle motor 13 is servo controlled by FG pulse signals so that the optical information recording medium 11 is rotated at an optional speed of rotation. The focus is adjusted on the optical information recording medium 11 face by the focus servo, and a laser beam 17 is condensed to write visual information on the optical information recording medium 11. At this occasion, the laser power is controlled by a front monitor so that writing at an appropriate power can be carried out. As the write signal, pulses with a duty of about 50% are irradiated on the optical information recording medium 11 face at an output of from 40 to 50 mW. The speed of rotation of the spindle is from 160 to 2,560 rpm.

(2) Measurement of Reflectivity

Using an integrating sphere (a spacer with an angle of 10°) for reflectivity measurement (against a standard white board) of Hitachi Spectrophotometer model U-3500, the spectral reflectivity (unit: %) of the label face of the optical information recording medium was measured by means of a light having a wavelength (780 nm) corresponding to the wavelength of the laser beam to be used for recording visual information.

Examples 1 to 7 and Comparative Examples 1 and 2

A polycarbonate resin substrate having a thickness of 1.2 mm and having grooves with a width of 0.45 μm and a depth of 155 nm was formed by injection molding. The substrate was coated with a fluorine alcohol solution of a metal complex of azo dyes by spin coating, followed by drying at 90° C. for 15 minutes to form an electronic information recording layer having a thickness of 70 nm. Then, Ag was sputtered on the electronic information recording layer to form a reflective layer having a thickness of 70 nm. Further, the reflective layer was coated with an ultraviolet (UV)-curing resin composed mainly of an acrylate monomer ("SD-374" manufactured by DAINIPPON INK AND CHEMICALS, INCORPORATED) by spin coating, followed by irradiation with ultraviolet (UV) rays for curing to form a protective layer having a thickness of 7 μm, whereby a CD-R was prepared. Then, toluene was added to 0.2 part by weight of a phthalide leuco dye, 0.6 part by weight of an electron-accepting compound comprising a phenolic compound, 0.05 part by weight of a bisanthrone infrared ray absorbing dye and 4 parts by weight of a binder resin (10 wt % toluene solution) as shown in Table 1, to prepare a color developing organic dye composition having a solid content concentration as shown in Table 1, and the protective layer was coated with the composition thus prepared by spin coating, followed by drying at 50° C. for 30 minutes to form a visual information recording layer. Further, the visual information recording layer was coated with a ultraviolet (UV)-curing resin composed mainly of an acrylate monomer ("SD-301" manufactured by DAINIPPON INK AND CHEMICALS INCORPORATED, viscosity: 500 CPS) by a spin coating method at a speed of rotation of 250 rpm for a rotation time of 6 seconds, followed by irradiation with ultraviolet (UV) rays for curing to form an overcoat layer (refractive index: 1.5) having a thickness of 20 μm. Nine types of optical information recording mediums having different reflectivities as shown in Table 1 were prepared in such a manner.

Each of the nine types of optical information recording mediums thus prepared was set to a recording apparatus 300 as shown in FIG. 3, and a low output laser beam having a wavelength (λ) of 780 nm and an output of 50 mW was applied from the label face side of the optical information recording medium to record visual information on the visual information recording layer. The results are shown in Table 1.

TABLE 1

| | Color developing organic dye composition | | | |
|---|---|---|---|---|
| | Binder resin | Concentration (wt %) | Reflectivity (%) | Focus |
| Ex. 1 | Acrylic resin | 16.4 | 15.3 | Good |
| Ex. 2 | Acrylic resin | 8.0 | 29.4 | Good |
| Ex. 3 | Acrylic resin | 18.3 | 21.6 | Good |
| Ex. 4 | Acrylic resin | 18.6 | 16.5 | Good |
| Ex. 5 | Styrene resin | 18.1 | 27.2 | Good |
| Ex. 6 | Styrene resin | 18.1 | 36.7 | Good |
| Ex. 7 | Styrene resin | 18.0 | 40.6 | Good |
| Comp. Ex. 1 | Acrylic resin | 22.6 | 6.8 | Poor |
| Comp. Ex. 2 | Acrylic resin | 18.8 | 12.0 | Poor |

As evident from the results shown in Table 1, it is found that when the optical information recording layer is irradiated with a low output laser beam having a wavelength (λ) of 780 nm, focusing of a low output laser beam having a wavelength (λ) of 780 nm and an output of 50 mW can favorably be carried out on each of the optical information recording mediums (Examples 1 to 7) having reflectivities of from 15.3 to 40.6%, and visual information can favorably be recorded on the visual information recording layer. On the other hand, it is found that on each of the optical information recording mediums having reflectivties of 6.8% (Comparative Example 1) and 12.0% (Comparative Example 2), focusing of the laser beam can not favorably be carried out and as a result, recording of clear visual information on the visual information recording layer is difficult.

The entire disclosure of Japanese Patent Application No. 2003-002210 filed on Jan. 8, 2003 including specification, claims, drawings and summary is incorporated herein by reference in its entirety.

What is claimed is:

1. An optical information recording medium comprising a substrate and a visual information recording layer which is formed directly or via another layer on the substrate and on which visual information is to be recorded by means of a laser beam to be applied from a label face side on the opposite side from the substrate side, characterized by having a reflectivity against a laser beam applied from the label face side of at least 15% and at most 50%.

2. The optical information recording medium according to claim 1, wherein the visual information recording layer has an overcoat layer formed on the label face side thereof.

3. The optical information recording medium according to claim 2, wherein the overcoat layer is formed so that the lower limit of the thickness of the overcoat layer is 10 μm and the upper limit is 100 μm.

4. The optical information recording medium according to claim 1, wherein the visual information recording layer is formed by such a material that its color developing properties or its transparency changes by a laser beam applied to the visual information recording layer.

5. The optical information recording medium according to claim 1, wherein the visual information recording layer has a reflective layer formed on at least one side thereof.

6. An optical information recording medium comprising a substrate having guide grooves and/or pits for recording and reading, and at least an electronic information recording layer on which digital information is to be recorded by means of a laser beam to be applied from the substrate side, a reflective layer and a visual information recording layer on which visual information is to be recorded by means of a beam to be applied from a label face side on the opposite side from the substrate side, laminated in this order on the substrate, characterized by having a reflectivity against a laser beam applied from the label face side on the opposite side from the substrate side, of at least 15% and at most 50%.

7. The optical information recording medium according to claim 6, wherein the visual information recording layer has an overcoat layer formed on the label face side thereof.

8. The optical information recording medium according to claim 7, wherein the overcoat layer is formed so that the lower limit of the thickness of the overcoat layer is 10 μm and the upper limit is 100 μm.

9. The optical information recording medium according to claim 6, wherein the visual information recording layer is formed by such a material that its color developing properties or its transparency changes by a laser beam applied to the visual information recording layer.

10. The optical information recording medium according to claim 6, wherein the visual information recording layer has a reflective layer formed on at least one side thereof.

11. An optical information recording medium comprising a substrate, and an electronic information recording layer on which digital information is to be recorded by means of a laser beam to be applied from the substrate side, a reflective layer formed on the opposite side of the electronic information recording layer from the substrate side, and a protective layer formed on the opposite side of the reflective layer from the substrate side, formed directly or via another layer on the substrate, characterized by having a visual information recording layer which is formed on the opposite side of the protective layer from the substrate side and on which visual information is to be recorded by means of a laser beam to be applied from a label face side on the opposite side from the substrate side, and an overcoat layer formed by a material transparent to a laser beam on the label face side of the visual information recording layer, and by having a reflectivity against a laser beam applied from the label face side on the opposite side from the substrate side, of at least 15% and at most 50%.

* * * * *